(12) United States Patent
Shaw et al.

(10) Patent No.: US 8,693,559 B2
(45) Date of Patent: Apr. 8, 2014

(54) METHOD AND SYSTEM FOR COMMUNICATION

(75) Inventors: Amit Shaw, Bangalore (IN); Satyam Srivastava, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 1620 days.

(21) Appl. No.: 11/829,888

(22) Filed: Jul. 28, 2007

(65) Prior Publication Data

US 2009/0028255 A1 Jan. 29, 2009

(51) Int. Cl.
*H04K 1/10* (2006.01)
*H04L 27/28* (2006.01)

(52) U.S. Cl.
USPC ............ 375/260; 375/261; 375/343; 375/267

(58) Field of Classification Search
USPC .................. 375/260, 259, 262, 299, 316, 261
See application file for complete search history.

(56) References Cited

U.S. PATENT DOCUMENTS

| | | | | |
|---|---|---|---|---|
| 6,594,320 B1 * | 7/2003 | Sayeed | ........................ | 375/281 |
| 6,633,614 B1 * | 10/2003 | Barton et al. | ................. | 375/264 |
| 7,489,755 B2 * | 2/2009 | Wang et al. | ................... | 375/363 |
| 7,643,570 B2 * | 1/2010 | Seki | .............................. | 375/267 |
| 7,710,910 B2 * | 5/2010 | Ode et al. | ...................... | 370/323 |
| 7,859,990 B2 * | 12/2010 | Mudulodu et al. | ............ | 370/210 |
| 2009/0052561 A1 * | 2/2009 | Baxley et al. | ................... | 375/260 |
| 2009/0141681 A1 * | 6/2009 | Hwang et al. | ................. | 370/329 |
| 2009/0323615 A1 * | 12/2009 | Ihm et al. | ...................... | 370/329 |
| 2010/0029320 A1 * | 2/2010 | Malladi et al. | ................ | 455/522 |
| 2010/0061223 A1 * | 3/2010 | Kim et al. | ..................... | 370/208 |
| 2010/0271930 A1 * | 10/2010 | Tong et al. | .................... | 370/208 |

* cited by examiner

*Primary Examiner* — Qutbuddin Ghulamali
(74) *Attorney, Agent, or Firm* — Prakash Nama; Global IP Services, PLLC

(57) ABSTRACT

A method and a system for communication are presented. In one example embodiment, the method includes the step of receiving a first frame of a communication signal. The first frame includes a first plurality of constituents. One or more constituents of the first plurality of constituents of the first frame form a symbol of the first frame. The method includes the step obtaining a second frame. The second frame includes the first plurality of constituents. One or more constituents of the first plurality of constituents of the second frame form a symbol of the second frame. The symbols of the second frame are obtained by creating redundancies of the constituents of the first plurality of one or more symbols of the first frame. The first frame includes a second plurality of constituents. One or more constituents of the second plurality of the first frame form a preamble field of the first frame. The step of obtaining includes the step of creating redundancies of one or more constituents of the second plurality of constituents at the beginning and/or at boundary(ies) of one or more symbols of the second frame.

16 Claims, 11 Drawing Sheets

METHOD AND SYSTEM FOR COMMUNICATION

FIELD OF SUBJECT MATTER

The present subject matter relates to a method and system for communication systems, more specifically it relates to a method and system for wireless communication systems.

BACKGROUND

Flawless/Reliable reception of communicated data is a desired feature in communication systems. Typically, communication systems transmit data in blocks of encoded frames. Each of the encoded frames may include a preamble field and a data field. The preamble field may include information for allowing the receiver to synchronize the received encoded frame and/or other information relating to the encoded data. Typically, the preamble field includes a number of known elements.

Generally, communication systems include a transmitter and a receiver that are capable of transmitting and receiving the encoded frame as described above. However, in terms of reception reliability, these systems are sufficiently poor when the transmitter and receiver are relatively in motion. Further, such systems may be vulnerable when distance between the transmitter and receiver is few hundred meters and the channel time dispersion between the transmitter and receiver is substantially high (typically 750 ns and higher).

It has remained a challenge to obtain a communication system that can communicate without loosing reception quality while the transmitter and receiver are in relative motion, while the transmitter and receiver obverse Doppler Effect due any other motion (typically, 250 kmph), and/or while the transmitter and receiver are under a high time dispersion of the channel. It is further a challenge to obtain a sufficiently reliable communication system that may communicate at distances substantially above 400 meters while being immune to the Doppler Effects and time dispersion of channel.

BRIEF DESCRIPTION OF DRAWINGS

Embodiments of the invention will now be described, by way of example only, with reference to the accompanying drawings in which.

DETAIL DESCRIPTION OF DRAWINGS

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 6:
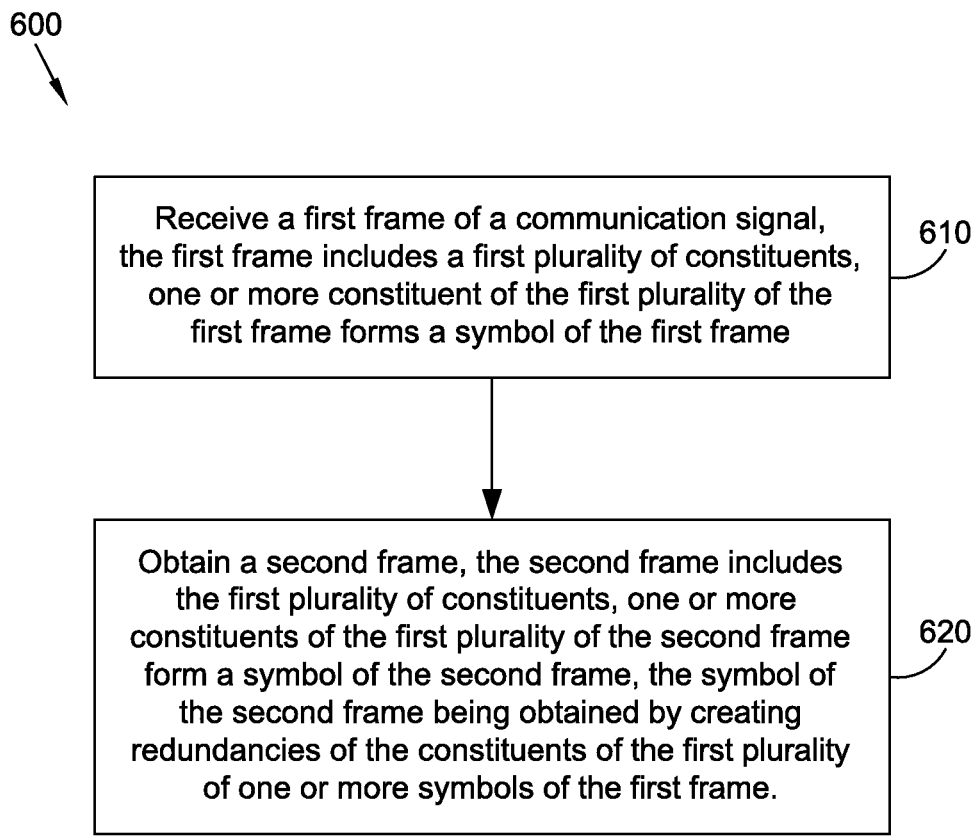
FIG. 6 is a flow diagram of a method in accordance with an embodiment of the present subject matter.

FIG. 6 is a flow diagram 600 of a method in accordance to one embodiment of the present subject matter. According to the method at step 610, a first frame of a communication signal is received. The first frame includes a first plurality of constituents. One or more constituents of the first plurality of constituents of the first frame form a symbol of the first frame. At step 620, a second frame is obtained. The second frame includes the first plurality of constituents. One or more constituents of the first plurality of constituents of the second frame form a symbol of the second frame. The symbols of the second frame are obtained by creating redundancies of the constituents of the first plurality of one or more symbols of the first frame. In some embodiments, the first frame includes a second plurality of constituents. One or more constituents of the second plurality of constituents of the first frame form a preamble field of the first frame and the second frame is obtained by creating redundancies of one or more constituents of the second plurality of constituents at the beginning of and/or between one or more symbols of the second frame. The second frame may be obtained by creating redundancies of one or more phase altered constituents of the second plurality of the constituents at the beginning and/or between one or more symbols of the second frame.

Obtaining the second frame by creating redundancies of the constituents of the first plurality generally ensures that the frame includes sufficient diversity of its constituents and therefore, the second frame can be sturdy against high delay spread. Further, including redundancies of the constituents of the second plurality generally ensures that the second frame is resilient to the high Doppler Effects. Creating redundancies of the constituent of the first plurality of constituents can be done either in time and/or frequency. This time/frequency diversity can ensure the reliable symbol detection under high delay spread. Further, creating the redundancies of the second plurality of constituents aids the receiver to readjust the high dynamics of channel and synchronization parameters. This ensures reliable reception of the second frame under high Doppler Effect. The second frame may also include indicators that may be indicative of the manner in which the second frame is obtained or the manner in which a meaningful data may be extracted from the second frame.

The first frame may be an orthogonal frequency division multiplexing (OFDM) frame. The symbol of the first frame may include one or more sub-carriers. Each of the sub-carriers may be mapped with one or more data bits nulls or pilots. The sub-carriers include data sub-carrier, pilot sub-carrier, null sub-carrier or any combination thereof. The second frame may be obtained by creating redundancies of one or more sub-carriers. The second plurality of constituents of the first frame may include a short preamble field and a long preamble field.

Figure 7:
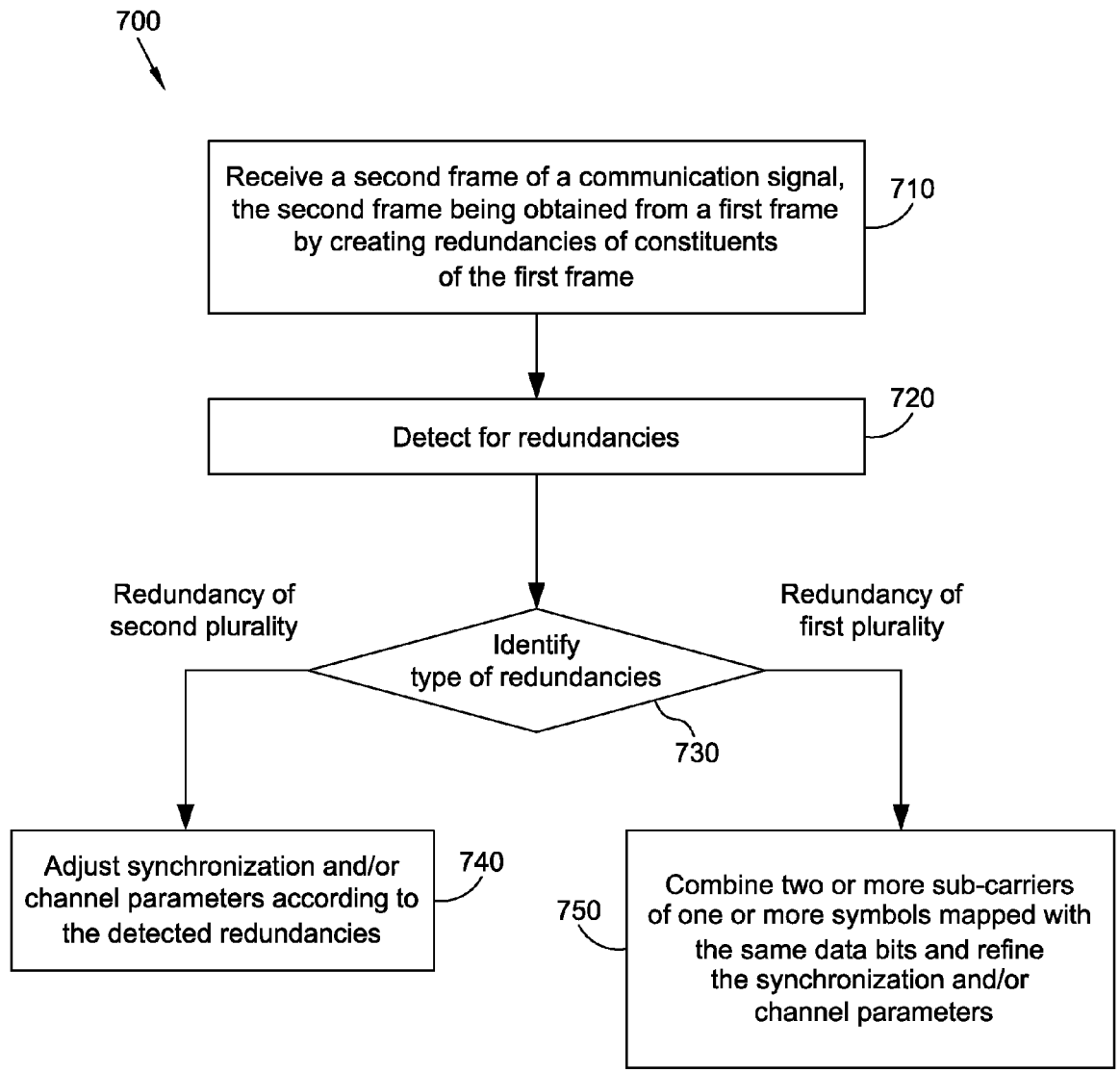
FIG. 7 is a flow diagram a method in accordance with an embodiment of the present subject matter.

FIG. 7 is a flow diagram 700 another method in accordance with one embodiment of the present subject matter. At step 710, a second frame is received. The second frame may have been obtained according to the method described above with reference to FIG. 6. At step 720, the frame may be examined for identifying type of redundancies. If redundancies of the constituents of the second plurality are detected then at step 740, synchronization and/or channel parameters may be adjusted according to the detected redundancies. If redundancies of the constituents of the first plurality are detected then at step 750, two or more sub-carriers of one or more symbols mapped with the same data bits may be combined. Also, it refines the synchronization and/or channel parameters. The steps 720 onwards may be repeated for each of the symbols of the second frame.

Figure 1:
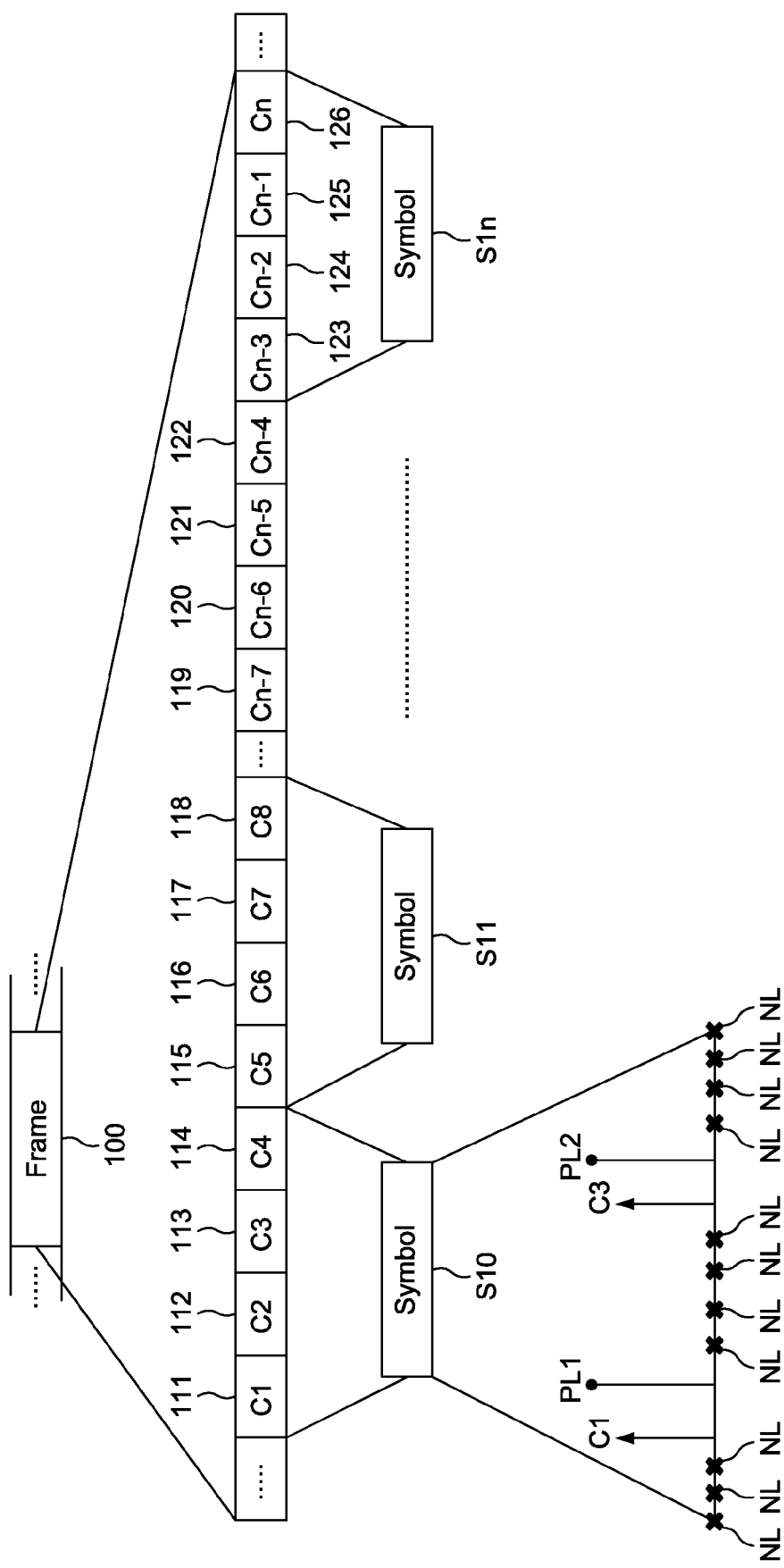
FIG. 1 is a first frame of a communication signal according to one embodiment of the present subject matter.

FIG. 1 shows a first frame 100 of a communication signal according to one embodiment of the present subject matter. The first frame 100 may be used for implementing the method of the present subject matter. The first frame 100 includes a first plurality of constituents C1 to Cn (111 to 126). One or more constituents of the first plurality of the first frame 100 form a symbol (e.g. S10, S11 ... S1n). An exploded view of the symbol S10 is shown as an example. In this example exploded view the symbol S10 is shown including one or more sub-carriers. The sub-carrier may include one or more data sub carriers C1 and C3 having mapped data bits and null sub-carriers having null NL mapped, and pilot sub-carriers having pilots PL1 and PL2 mapped. The pilots PL1 and PL2 correspond to the constituents C2 112 and C4, 114 of the symbol S10. The sub-carriers may include any combination of the data sub-carriers, the pilot sub-carriers and/or the null sub-carriers.

Figure 2:
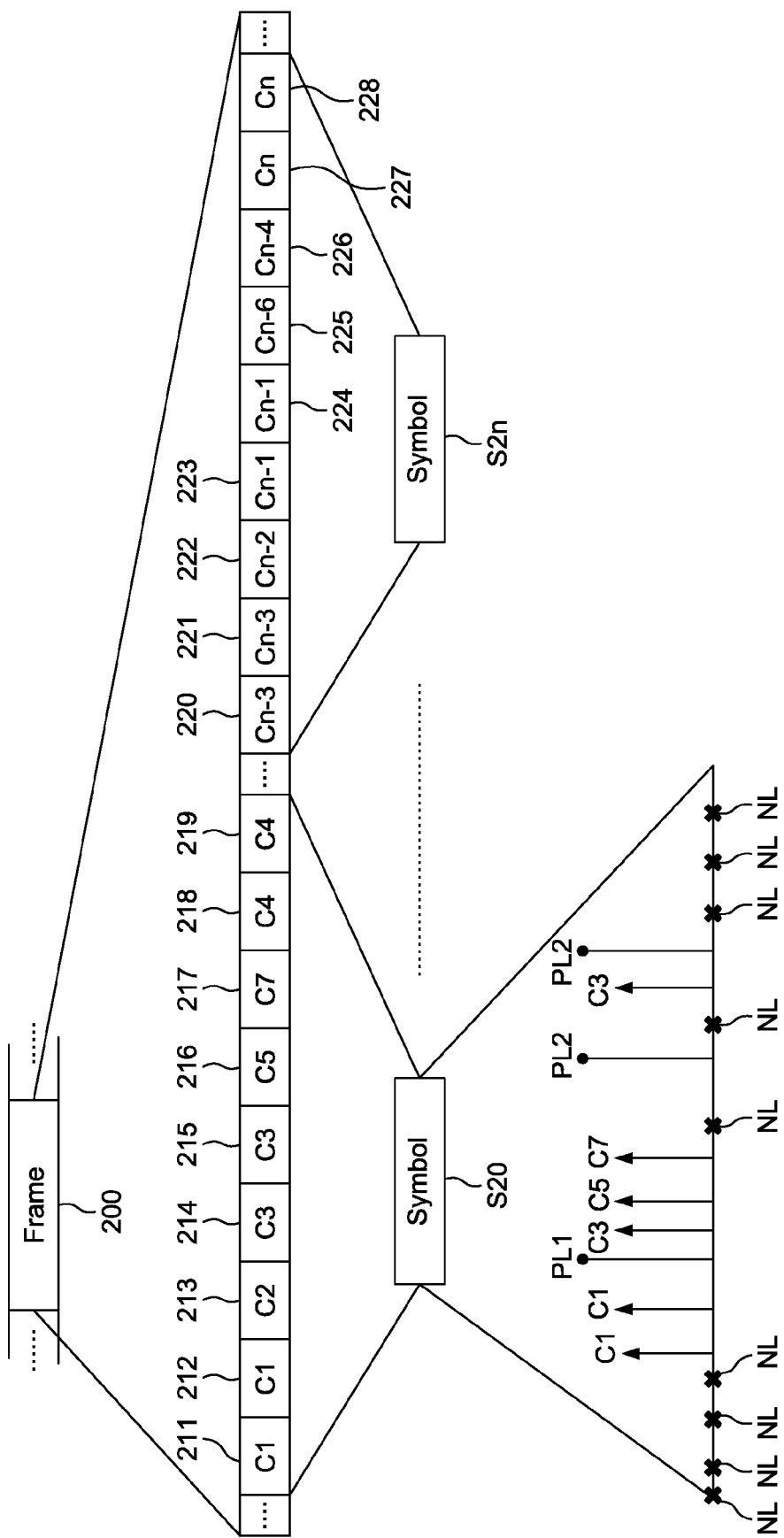
FIG. 2 is a second frame of a communication signal according to one embodiment of the present subject matter.

FIG. 2 is a second frame 200 of a communication signal according to another embodiment of the present subject matter. The second frame 200 may be obtained from the first frame 100. As shown in FIG. 2, the second frame 200 includes a first plurality of constituents C1, C2, C3 and so on. One or more constituents of the first plurality of constituents of the second frame 200 form a symbol of the second frame 200. For example, a symbol S20 is shown that includes constituents 211 to 219, another symbol S2n is shown that includes constituents 220 to 228. The second frame 200 is obtained by creating redundancies of the constituents of the first plurality of one or more symbols of the first frame 100. An exploded view of the symbol S20 is also shown in the FIG. 2 as an example. The exploded view shows that the symbol S20 includes sub-carriers. The sub-carriers may be data sub-carriers C1, C3, C5 and C7 mapped with the data bits. The data sub-carriers are obtained by creating redundancies of the data sub-carriers of the symbols S10-S11 of the first frame 100. The sub-carriers also include pilot sub-carriers PL1-PL2. The pilot sub-carriers are obtained by creating redundancies of the pilot sub-carriers of the symbols S10 of the first frame 100. The pilots PL1 and PL2 correspond to the constituents C2, 213 and C4, 218 and 219 of symbol S20. The sub-carriers further include null sub-carriers NL.

Figure 3:
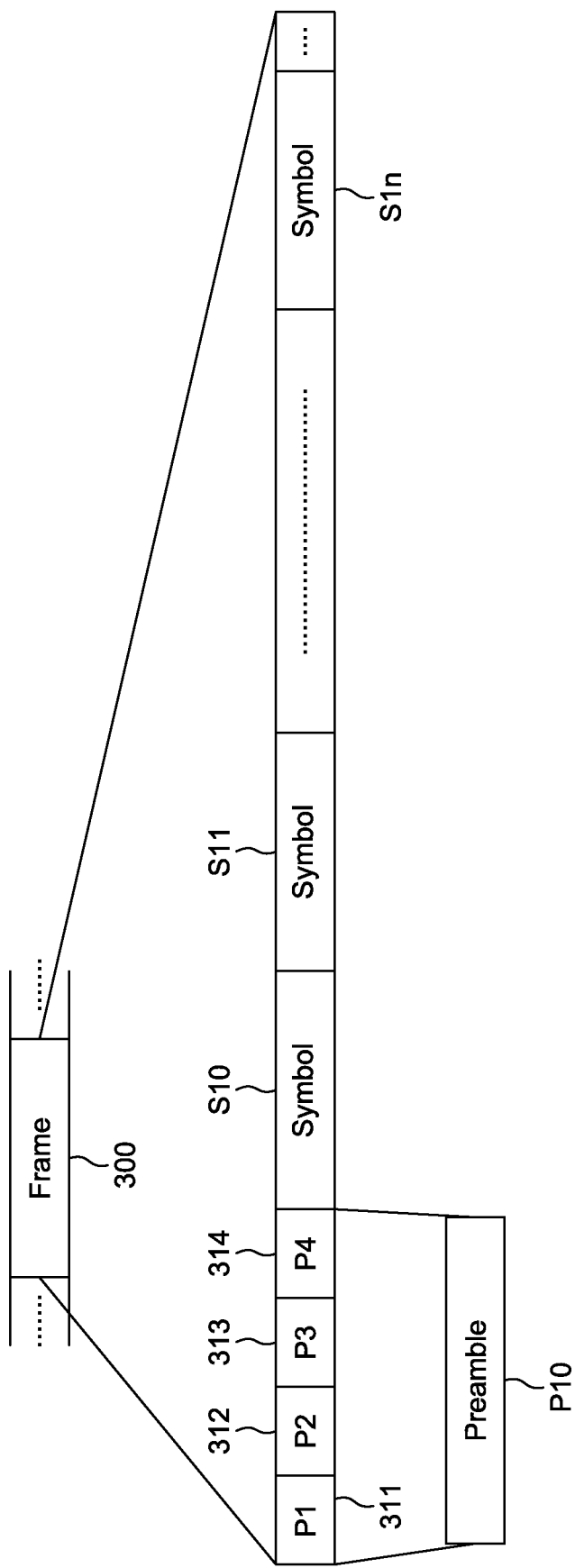
FIG. 3 is a frame of a communication signal according to one embodiment of the present subject matter.

FIG. 3 is a frame 300 of a communication signal according to another embodiment of the present subject matter. The frame 300 includes a second plurality of constituents P1, P2, P3 P4, 311, 312, 313 and 314. The one or more constituents P1-P4 of the second plurality of constituents of the first frame forms a preamble field P10 of the frame 300. The frame 300 may also include symbols S10-S1n as described for FIG. 1. The second plurality of constituents of the frame 300 may form a short preamble field and a long preamble field.

Figure 4:
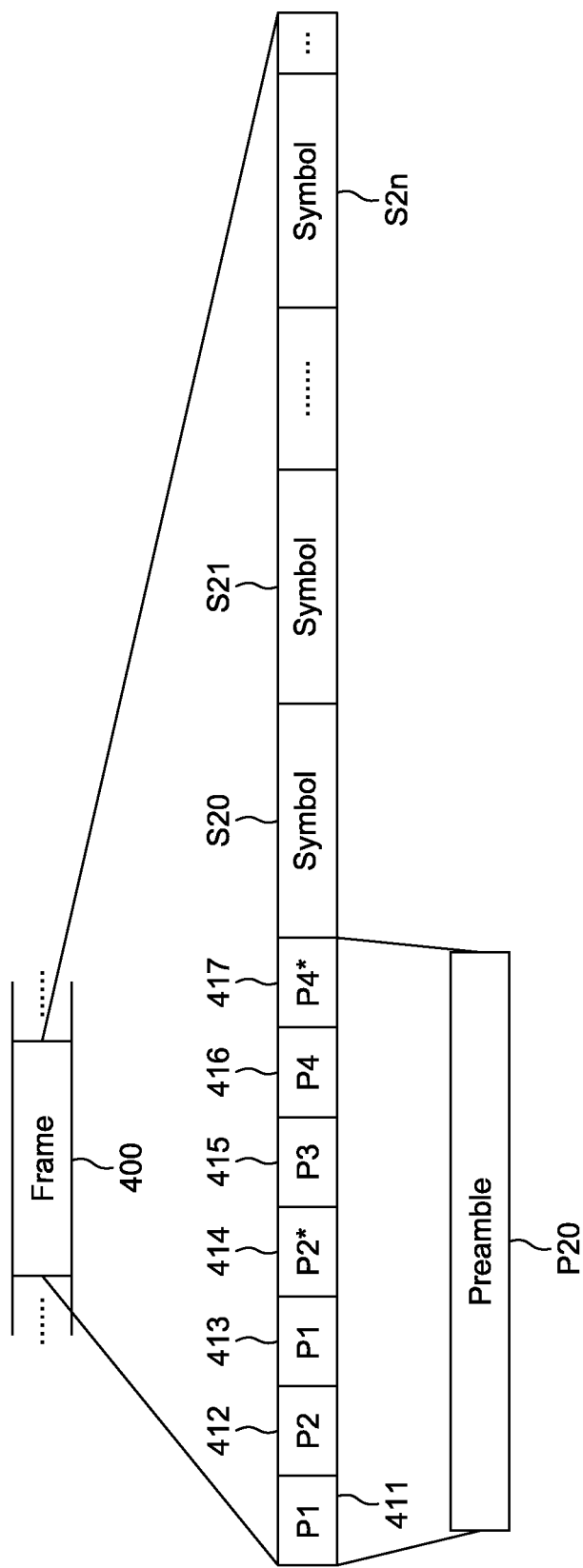
FIG. 4 is another frame of a communication signal according to one embodiment of the present subject matter.

FIG. 4 is another frame 400 of a communication signal according to one embodiment of the present subject matter. The frame 400 may be obtained from the frame 300 described with reference to FIG. 3. The frame 400 includes redundancies of the constituents P1-P4 of the second plurality of constituents. The second plurality of constituents is described in FIG. 3. The frame 400 may include redundancies of the phase altered constituents P2* and P4* of the second plurality of constituents. One or more constituents of the second plurality of constituents 411-417 may form a preamble field P20 of the frame 400. The frame 400 may include any combination of the symbols S20-S2n. The symbols S20-S2n have been described earlier with reference to FIGS. 1-3.

Figure 5:
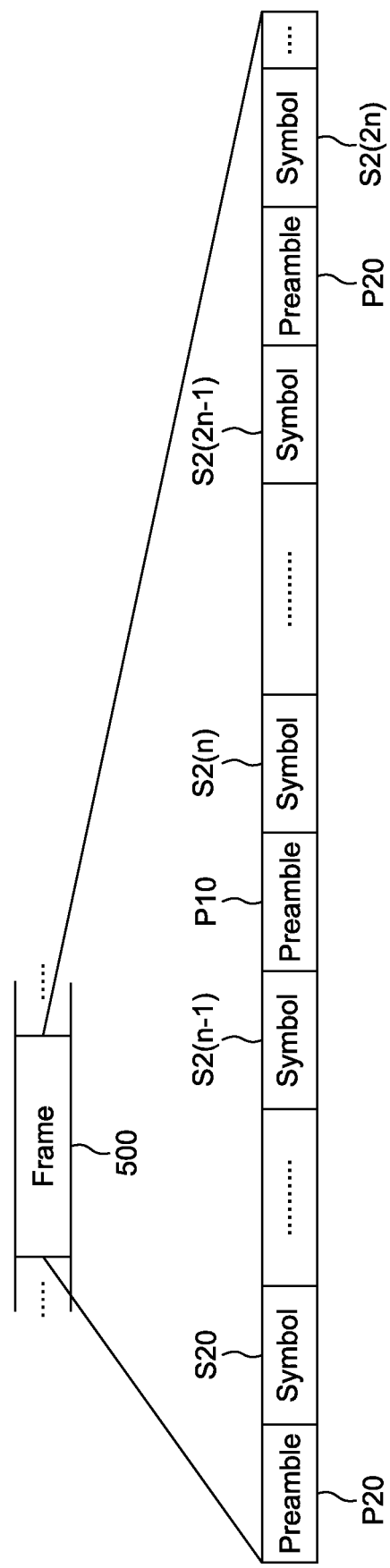
FIG. 5 is another frame of a communication signal according one embodiment of the present subject matter.

FIG. 5 is another frame 500 of a communication signal according one embodiment of the present subject matter. The frame 500 is obtained by creating redundancies of one or more constituents of the second plurality of constituents at the beginning of, S20, and/or in between one or more symbols, S2(n−1)-S2(n) and so on, of the frame 500. The symbols S20-S2(n−1) and so on, of the frame 500 may be obtained according to above described methods with reference to FIGS. 6 and 7.

Figure 8:
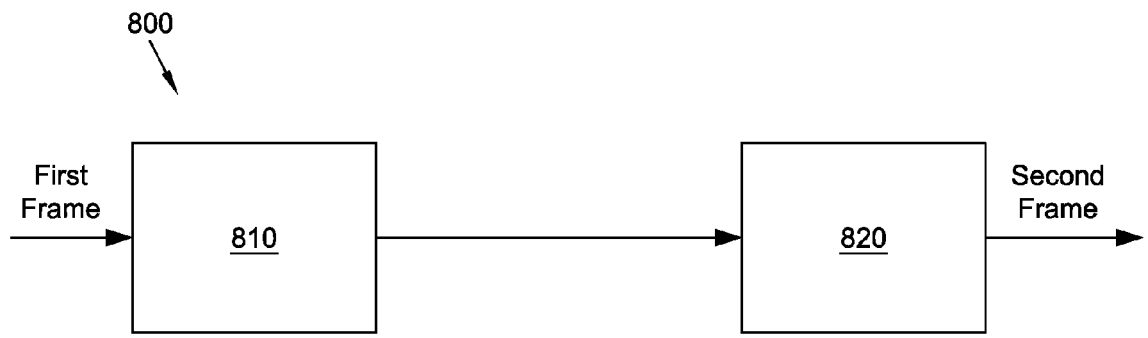
FIG. 8 is a device according to the present subject matter.

FIG. 8 is an example device 800 according to the present subject matter. The device 800 includes a first unit 810. The first unit 810 is configured for receiving a first frame of a communication signal. The first frame includes a first plurality of constituents. One or more constituents of the first plurality of the first frame form a symbol of the first frame. The device 800 also includes a second unit 820. The second unit 820 is configured for obtaining a second frame. The second frame includes the first plurality of constituents. One or more constituents of the first plurality of constituents of the second frame form a symbol of the second frame. The second unit 820 is configured for obtaining the symbols of the second frame by creating redundancies of the constituents of the first plurality of one or more symbols of the first frame. The first frame may include a second plurality of constituents. One or more constituents of the second plurality of constituents of the first frame form a preamble field of the first frame. The second unit 820 may be configured for performing a step of creating redundancies of one or more constituents of the second plurality of constituents at the beginning of and/or in between one or more symbols of the second frame.

The first frame may be a frame as described in FIG. 1 and/or FIG. 3. The second frame may be a frame as described in FIG. 2, FIG. 4 or FIG. 5. The first frame is an OFDM frame. The symbol of the first frame includes one or more sub-carriers. Each sub-carrier is mapped with one or more data bits, null, or pilot. The second plurality of constituents of the first frame includes a short preamble field and a long preamble field. The sub-carrier includes data sub-carrier, pilot sub-carrier, null sub-carrier or any combination thereof. The second unit 820 may be configured for creating redundancies of one or more sub-carriers. The second unit 820 may be configured for creating redundancies by mapping data bits of the sub-carrier on one or more sub-carriers. The second unit 820 may be configured for creating redundancies of one or more phase altered constituents of the second plurality of the constituents.

Figure 9:
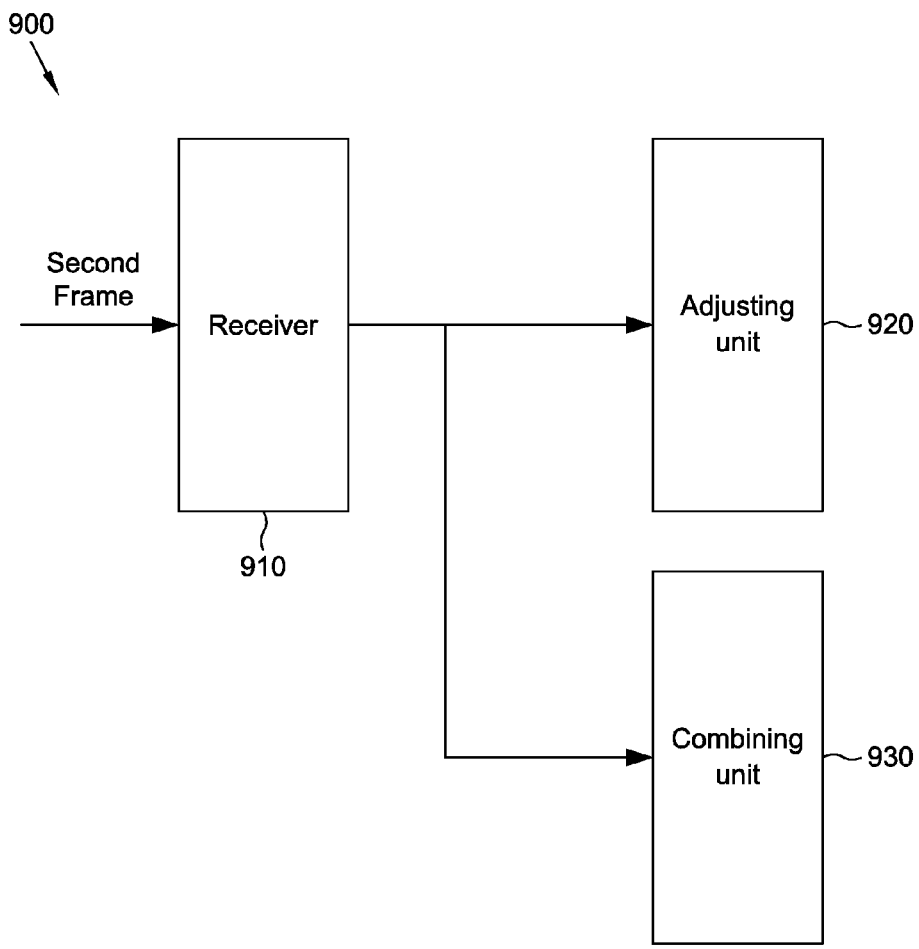
FIG. 9 is another device according to the present subject matter.

FIG. 9 is a device 900 according to the present subject matter. The device 900 includes a receiving unit 910. The receiving unit 910 may be configured for receiving a second frame of a communication signal. The second frame which has been obtained from a first frame. The first frame includes a first plurality of constituents and a second plurality of the constituents. One or more constituents of the first plurality of constituents of the first frame form a symbol of the first frame. One or more constituents of the second plurality of constituents form a preamble field of the first frame. The second frame may include the first and the second plurality of constituents. One or more constituents of the first plurality of constituents of the second frame form a symbol of the second frame. The symbol of the second frame may be obtained by creating redundancies of the constituents of one or more symbols of the first frame. The second frame may be obtained by creating redundancies of the one or more constituents of the second plurality of constituents at the beginning and/or in between one or more symbols of the second frame. The device 900 further includes an adjusting unit 920. The adjusting unit 920 may be configured for detecting the constituents of the second plurality. The adjusting unit 920 may further be configured for adjusting synchronization and/or channel parameters according to the detected redundancies of second plurality. The device 900 also includes a combining unit 930. The combining unit 930 may be configured for detecting the constituents of the first plurality of constituents. The combining unit 930 may also be configured for combining two or more sub-carriers of one or more symbols mapped with the same data bits. The combining unit 930 may also be configured for refining the synchronization and/or channel parameters.

Figure 10:
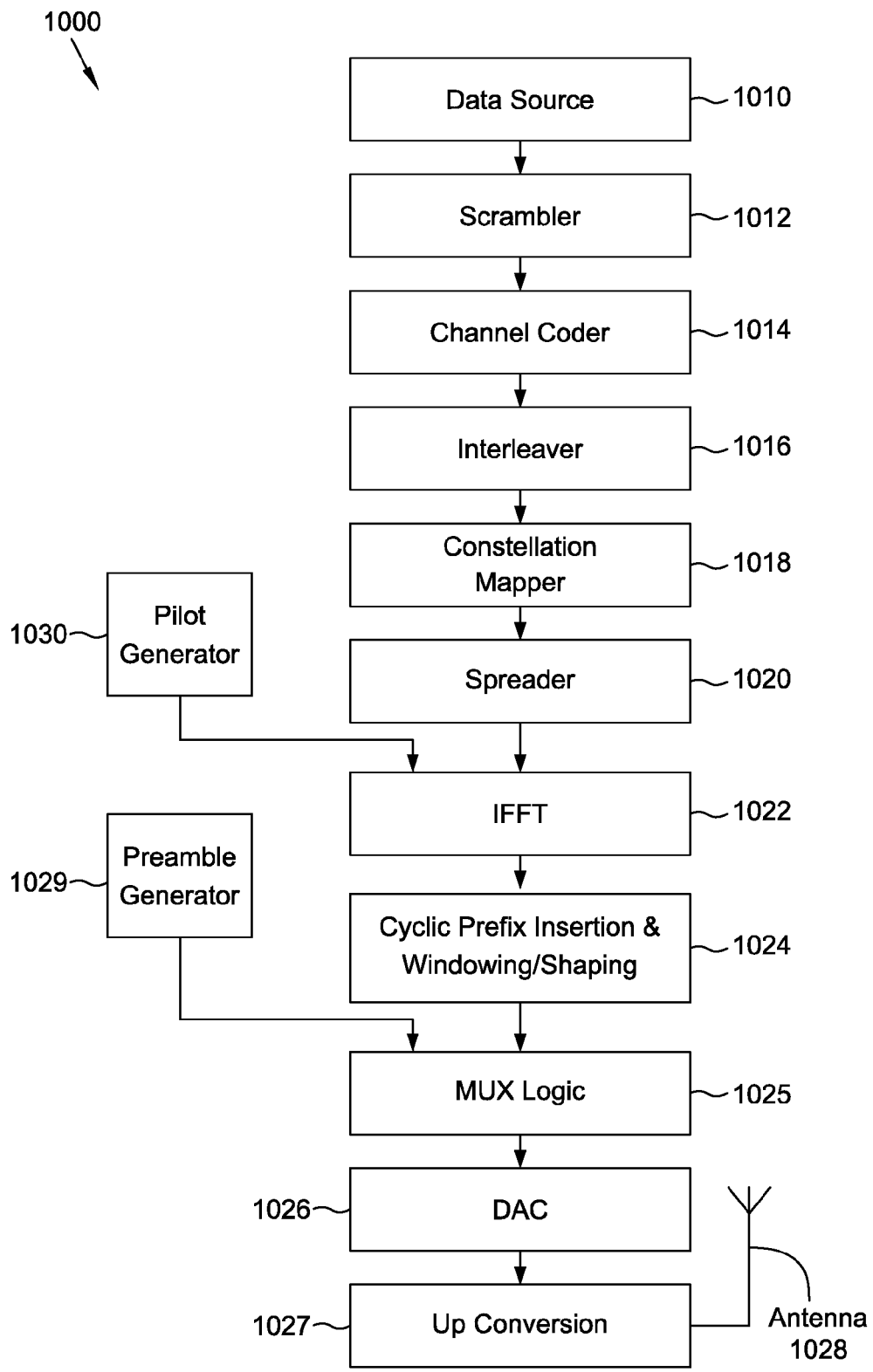
FIG. 10 is another device according to an embodiment of the present subject matter.

FIG. 10 is a device 1000 according to an embodiment of the present subject matter. The device 1000 includes following blocks, a data source 1010, a scrambler 1012, a channel coder 1014, an interleaver 1016, a constellation mapper 1018, a spreader 1020, an IFFT 1022, cyclic prefix insertion and windowing/shaping 1024, MUX logic 1025, a DAC (Digital to Analog Converter) 1026, up conversion 1027, a pilot generator 1030, a preamble generator 1029 and an antenna 1028. The data source 1010 generates the data to be transmitted. This data is passed to the scrambler 1012 which randomizes the data. The output of the Scrambler 1012 is given to the Channel coder 1014. The channel coder 1014 encodes the scrambled data to create coded data. The coded data is fed to the Interleaver block 1016 which permutes the coded data to create interleaved data. The interleaved data is mapped to constellations at the Constellation Mapper 1018. The mapped constellations are spread to create redundancy of the data at the Spreader 1020. The Pilot Generator 1030 generates the pilot sub carriers. The output of the Spreader 1020 and Pilot generation 1030 are fed to the IFFT 1022 which performs the IFFT (Inverse Fast Fourier Transform) of the input data. The IFFT output data is fed to the cyclic prefix insertion and windowing/shaping 1024 which inserts the cyclic extension of the IFFT output symbol and performs windowing/shaping on the resultant symbols. The output of the cyclic prefix insertion and windowing/shaping 1024 is fed to a MUX logic 1025 which gets another input from the preamble generator 1029. The MUX logic selects the one of the input signal based on the format of the second frame as described above. The output of the MUX logic 1025 is converted to analog signal by passing it through the DAC 1026 and then up converted to carrier frequency by the Up conversion 1027 and then transmitted through the Antenna 1028.

Figure 11:
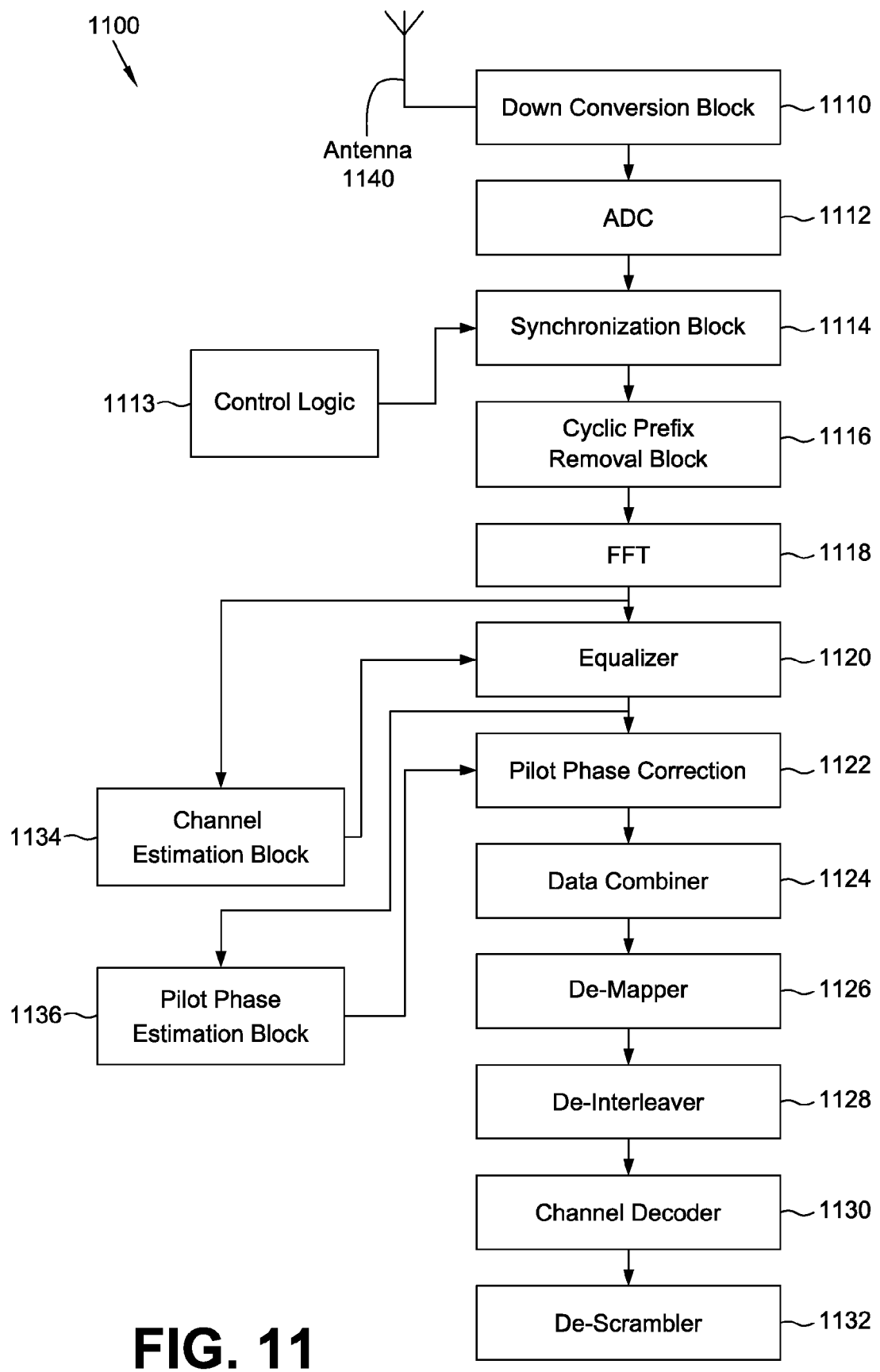
FIG. 11 is another device according to an embodiment of the present subject matter.

FIG. 11 is another embodiment of a device 1100 according to present subject matter. The device 1100 may include following blocks: an antenna 1140, down conversion 1110, an ADC (Analog to Digital Converter) 1112, a synchronization block 1114, a control logic 1113, a cyclic prefix removal block 1116, an FFT block 1118, a equalizer 1120, a pilot phase correction 1122, a data combiner 1124, a de-mapper 1126, a de-interleaver 1128, a channel decoder 1130, a descrambler 1132, a channel estimation block 1134 and a pilot phase estimation block 1136. The antenna 1140 receives a signal and the signal may include a frame. The signal received by the antenna 1140 is down converted to the base band or intermediate frequency by the down conversion block 1110. The signal at the output of the down conversion block 1110 is digitalized by the Analog to Digital Converter (ADC) 1112 and the digitalized samples are sent to the synchronization block 1114 which estimates the synchronization parameter and corrects the digital samples with the estimated synchronization parameters. The output of the synchronization block 1114 is fed to the cyclic prefix removal block 1116, which removes the cyclic prefix from the symbol of the received signal and sends the symbol to the FFT 1118. The FFT 1118 converts the time domain samples to frequency domain and outputs the sub-carriers to the equalizer 1120. The equalizer 1120 computes equalizer coefficients using channel coefficients obtained from the channel estimation block 1134. The equalizer 1120 then equalizes the sub-carriers and sends the data sub-carriers to the pilot phase correction 1122 and the pilot sub-carriers to the pilot phase estimation block 1136. The pilot phase estimation block 1136 estimates the residual phase using the received pilot sub-carriers and feeds the estimated phase to the pilot phase correction 1122. The pilot phase correction block 1122 corrects the received data sub-carriers with the estimated pilot phase and sends the corrected data sub-carriers to the data combiner 1124. The data combiner 1124 combines the sub-carriers which have been mapped with the same data bits. The combined data is sent to the de-mapper 1126 which gives soft/hard decision for the bits mapped to the sub-carriers. The soft/hard decisions are fed to the de-interleaver 1128 which de-interleaves the soft/hard decisions and sends this to the channel decoder 1130. The channel decoder 1130 decodes the data and sends the decoded data to the de-scrambler 1132 which descrambles the data and provides it to the data sink for further processing.

Figure 12:
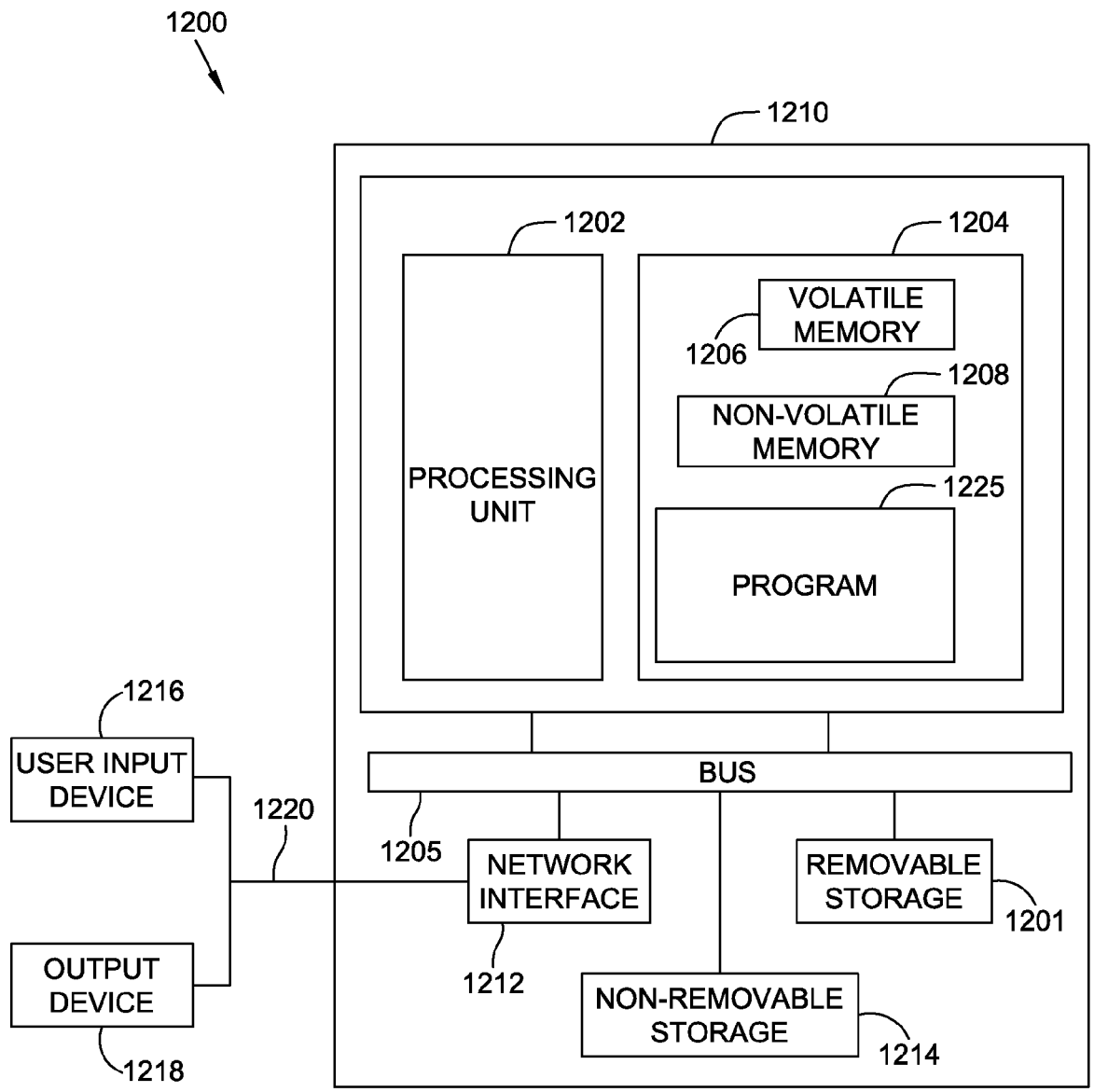
FIG. 12 is an example of a suitable computing system environment for implementing embodiments of the present subject matter.

FIG. 12 shows an example of a suitable computing system environment 1200 for implementing embodiments of the present subject matter. FIG. 12 and the following discussion are intended to provide a brief, general description of a suitable computing environment in which certain embodiments of the inventive concepts contained herein may be implemented.

A general computing device, in the form of a computer 1210, may include a processor 1202, memory 1204, removable storage 1201, and non-removable storage 1214. Computer 1210 additionally includes a bus 1205 and a network interface 1212.

Computer 1210 may include or have access to a computing environment that includes one or more user input devices 1216, one or more output devices 1218, and one or more communication connections 1220 such as a network interface card or a USB connection. The one or more output devices 1218 can be a display device of computer, computer monitor, TV screen, plasma display, LCD display, display on a digitizer, display on an electronic tablet, and the like. The computer 1210 may operate in a networked environment using the communication connection 1220 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 1204 may include volatile memory 1206 and non-volatile memory 1208. A variety of computer-readable media may be stored in and accessed from the memory elements of computer 1210, such as volatile memory 1206 and non-volatile memory 1208, removable storage 1201 and non-removable storage 1214. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, Application Specific Integrated Circuits (ASIC), single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 1202 of the computer 1210. For example, a program module 1225 may include machine-readable instructions capable performing steps according to above described subject matter. In one embodiment, the program module 1225 may be included on a CD-ROM and loaded from the CD-ROM to a hard drive in non-volatile memory 1208. The machine-readable instructions cause the computer 1210 to encode according to the various embodiments of the present subject matter. The subject matter further teaches a computer readable medium that includes instructions for performing steps according to the present subject matter. The subject matter further provides an article that includes the computer readable medium according to the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods. Other embodiments will be readily apparent to those of ordinary skill in the art. The elements, algorithms, and sequence of operations can all be varied to suit particular requirements. The operations described-above with respect to the method illustrated herein may be performed in a different order from those shown and described herein.

Illustrated FIGS. 1-12. are merely representational and are not drawn to scale. Certain proportions thereof may be exaggerated, while others may be minimized. The FIGS. 1-12 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus, the following claims are hereby incorporated into the detailed description of the embodiments of the invention, with each claim standing on its own as a separate preferred embodiment.

The invention claimed is:

1. A method, comprising:
   receiving a first frame of a communication signal, the first frame includes a first plurality of constituents, one or more constituents of the first plurality of constituents of the first frame form a symbol of the first frame, wherein the symbol of the first frame includes one or more sub-carriers, and wherein the one or more sub-carriers includes data sub-carriers, pilot sub-carriers, null sub-carriers or any combination thereof; and
   obtaining a second frame, the second frame includes the first plurality of constituents, one or more constituents of the first plurality of constituents of the second frame form a symbol of the second frame, and the symbol of the second frame being obtained by creating redundancies by duplicating at least one of the data sub-carriers and pilot sub-carriers of the constituents of the first plurality of one or more symbols of the first frame, wherein creating redundancies by duplicating includes creating time/frequency diversity of the at least one of the data sub-carriers and the pilot sub-carriers of the constituents of the first plurality of one or more symbols of the first frame.

2. The method as claimed in claim 1, wherein the first frame includes a second plurality of constituents, one or more constituents of the second plurality of constituents of the first frame form a preamble field of the first frame and the step of obtaining comprises creating redundancies of one or more constituents of the second plurality of constituents at the beginning and/or in between the one or more symbols of the second frame.

3. The method as claimed in claim 2, wherein the first frame is an orthogonal frequency division multiplexing (OFDM) frame.

4. The method as claimed in claim 3, wherein each sub-carrier is mapped with one or more data bits or null and the second plurality of constituents of the first frame includes, a short preamble field and a long preamble field.

5. The method as claimed in claim 2, wherein the step of obtaining includes the step of creating redundancies of one or more phase altered constituents of the second plurality of the constituents.

6. A method comprising the steps of:
   receiving a second frame of a communication signal, the second frame being obtained from a first frame, the first frame includes a first plurality of constituents and a second plurality of the constituents, one or more constituent of the first plurality of the first frame form a symbol of the first frame, one or more constituents of the second plurality forms a preamble field of the first frame, the second frame includes the first plurality of constituents, one or more constituents of the first plurality of the second frame form a symbol of the second frame, the symbol of the second frame being obtained by creating redundancies of the constituents of the first plurality of one or more symbols of the first frame and the second frame is obtained by creating redundancies of one or more constituents of the second plurality at the boundary(ies) of one or more symbols of the second frame;

detecting for the constituents of the second plurality and adjusting synchronization and/or channel parameters according to the detected redundancies; and detecting for the constituents of the first plurality and combining two or more sub-carriers of one or more symbols mapped with the same data bits, and/or refining synchronization and/or channel parameters.

7. A device comprising:

a first unit for receiving a first frame of a communication signal, the first frame includes a first plurality of constituents, one or more constituents of the first plurality of constituents of the first frame form a symbol of the first frame, wherein the symbol of the first frame includes one or more sub-carriers, and wherein the one or more sub-carriers includes data sub-carriers, pilot sub-carriers, null sub-carriers or any combination thereof; and a second unit for obtaining a second frame, the second frame includes the first plurality of constituents, one or more constituents of the first plurality of constituents of the second frame form a symbol of the second frame, and the symbol of the second frame being obtained by creating redundancies by duplicating at least one of the data sub-carriers and pilot sub-carriers of the constituents of the first plurality one or more symbols of the first frame, wherein creating redundancies by duplicating includes creating time/frequency diversity of the at least one of the data sub-carriers and the pilot sub-carriers of the constituents of the first plurality of one or more symbols of the first frame.

8. The device as claimed in claim 7, wherein the first frame includes a second plurality of constituents, one or more constituents of the second plurality of the first frame form a preamble field of the first frame and the second unit being configured for performing a step of creating redundancies of one or more constituents of the second plurality at the beginning and/or in between the one or more symbols of the second frame.

9. The device as claimed in claim 8, wherein the first frame is an OFDM frame.

10. The device as claimed in claim 9, wherein each sub-carrier is mapped with one or more data bits or null and the second plurality of constituents of the first frame includes, a short preamble field and a long preamble field.

11. The device as claimed in claim 8, wherein the second unit is configured for creating redundancies of one or more phase altered constituents of the second plurality of the constituents.

12. The device comprising:

a receiving unit configured for receiving a second frame of a communication signal, the second frame being obtained from a first frame, the first frame includes a first plurality of constituents and a second plurality of the constituents, one or more constituents of the first plurality of the first frame form a symbol of the first frame, one or more constituents of the second plurality form a preamble field of the first frame, the second frame includes the first plurality of constituents, one or more constituents of the first plurality of the second frame forms a symbol of the second frame, the symbol of the second frame being obtained by creating redundancies of the constituents of one or more symbols of the first frame and the second frame is obtained by creating redundancies of one or more constituents of the second plurality at the boundary/ies of one or more symbols of the second frame;

an adjusting unit configured for detecting the constituents of the second plurality and adjusting synchronization and/or channel parameters according to the detected redundancies; and a combining unit configured for detecting the constituents of the first plurality of constituents and combining two or more sub-carriers of one or more symbols mapped with the same data bits, and/or refining synchronization and/or channel parameters.

13. A computer system comprising:

a processing unit; and a memory coupled to the processor, the memory having stored therein a code for performing steps of:

receiving a first frame of a communication signal, the first frame includes a first plurality of constituents, one or more constituents of the first plurality of constituents of the first frame form a symbol of the first frame, wherein the symbol of the first frame includes one or more sub-carriers, and wherein the one or more sub-carriers includes data sub-carriers, pilot sub-carriers, null sub-carriers or any combination thereof; and obtaining a second frame, the second frame includes the first plurality of constituents, one or more constituents of the first plurality of constituents of the second frame form a symbol of the second frame, and the symbol of the second frame being obtained by creating redundancies by duplicating at least one of the data sub-carriers and pilot sub-carriers of the constituents of the first plurality of one or more symbols of the first frame, wherein creating redundancies by duplicating includes creating time/frequency diversity of the at least one of the data sub-carriers and the pilot sub-carriers of the constituents of the first plurality of one or more symbols of the first frame.

14. A non-transitory computer-readable storage medium operable with a computer system, the non-transitory computer-readable medium having stored thereon instructions operable with an architectural simulator environment supported by the computer system, comprising instructions for performing steps of:

receiving a first frame of a communication signal, the first frame includes a first plurality of constituents, one or more constituents of the first plurality of constituents of the first frame form a symbol of the first frame, wherein the symbol of the first frame includes one or more sub-carriers, and wherein the one or more sub-carriers includes data sub-carriers, pilot sub-carriers, null sub-carriers or any combination thereof; and obtaining a second frame, the second frame includes the first plurality of constituents, one or more constituents of the first plurality of constituents of the second frame form a symbol of the second frame, and the symbol of the second frame being obtained by creating redundancies by duplicating at least one of the data sub-carriers and pilot sub-carriers of the constituents of the first plurality of one or more symbols of the first frame, wherein creating redundancies by duplicating include creating time/frequency diversity of the at least one of the data sub-carriers and the pilot sub-carriers of the constituents of the first plurality of one or more symbols of the first frame.

15. An article comprising the non-transitory computer-readable storage medium of claim 14.

16. An article comprising a device, wherein the device comprising:

a first unit for receiving a first frame of a communication signal, the first frame includes a first plurality of constituents, one or more constituents of the first plurality of constituents of the first frame form a symbol of the first frame, wherein the symbol of the first frame includes one or more sub-carriers, and wherein the one or more sub-carriers includes data sub-carriers, pilot sub-carriers, null sub-carriers or any combination thereof; and a second unit for obtaining a second frame, the second frame includes the first plurality of constituents, one or more constituents of the first plurality of constituents of the second frame form a symbol of the second frame, and the symbol of the second frame being obtained by creating redundancies by duplicating at least one of the data sub-carriers and pilot sub-carriers of the constituents of the first plurality one or more symbols of the first frame, wherein creating redundancies by duplicating includes creating time/frequency diversity of the at least one of the data sub-carriers and the pilot sub-carriers of the constituents of the first plurality of one or more symbols of the first frame.

* * * * *